(12) United States Patent
Williams et al.

(10) Patent No.: US 7,893,357 B2
(45) Date of Patent: Feb. 22, 2011

(54) ROEBEL WINDING WITH CONDUCTIVE FELT

(75) Inventors: Mark A. Williams, Landrum, SC (US); Steven L. Castleberry, Greer, SC (US)

(73) Assignee: Electrolock, Inc., Hiram, OH (US)

( * ) Notice: Subject to any disclaimer, the term of this patent is extended or adjusted under 35 U.S.C. 154(b) by 0 days.

(21) Appl. No.: 12/052,459

(22) Filed: Mar. 20, 2008

(65) Prior Publication Data
US 2008/0230253 A1    Sep. 25, 2008

Related U.S. Application Data

(60) Provisional application No. 60/895,774, filed on Mar. 20, 2007.

(51) Int. Cl.
*H01B 7/00* (2006.01)
(52) U.S. Cl. ..................................... 174/116
(58) Field of Classification Search ............... 174/116, 174/102 SC
See application file for complete search history.

(56) References Cited

U.S. PATENT DOCUMENTS

| 5,066,881 | A | 11/1991 | Elton et al. |
| 5,175,396 | A | 12/1992 | Emery et al. |
| 5,633,477 | A | 5/1997 | Smith et al. |
| 5,771,563 | A | * 6/1998 | Meier et al. ................. 29/596 |
| 5,962,945 | A | 10/1999 | Krenzer et al. |
| 6,559,384 | B1 | 5/2003 | Angell et al. |
| 6,677,848 | B1 | 1/2004 | Emery |
| 6,724,118 | B2 | 4/2004 | Emery |
| 6,827,805 | B2 | 12/2004 | Angell et al. |

FOREIGN PATENT DOCUMENTS

JP    02151247 A    6/1990

OTHER PUBLICATIONS

International Search Report and Written Opinion for International Appl. Serial No. PCT/US2008/057737, dated Aug. 2008.

* cited by examiner

*Primary Examiner*—Chau N Nguyen
(74) *Attorney, Agent, or Firm*—Pearne & Gordon LLP

(57) ABSTRACT

A conductive filler comprising a conductive felt and a non-conductive resin for use in a Roebel bar or winding and the manufacture of the conductive filler and Roebel bar or winding.

23 Claims, 3 Drawing Sheets

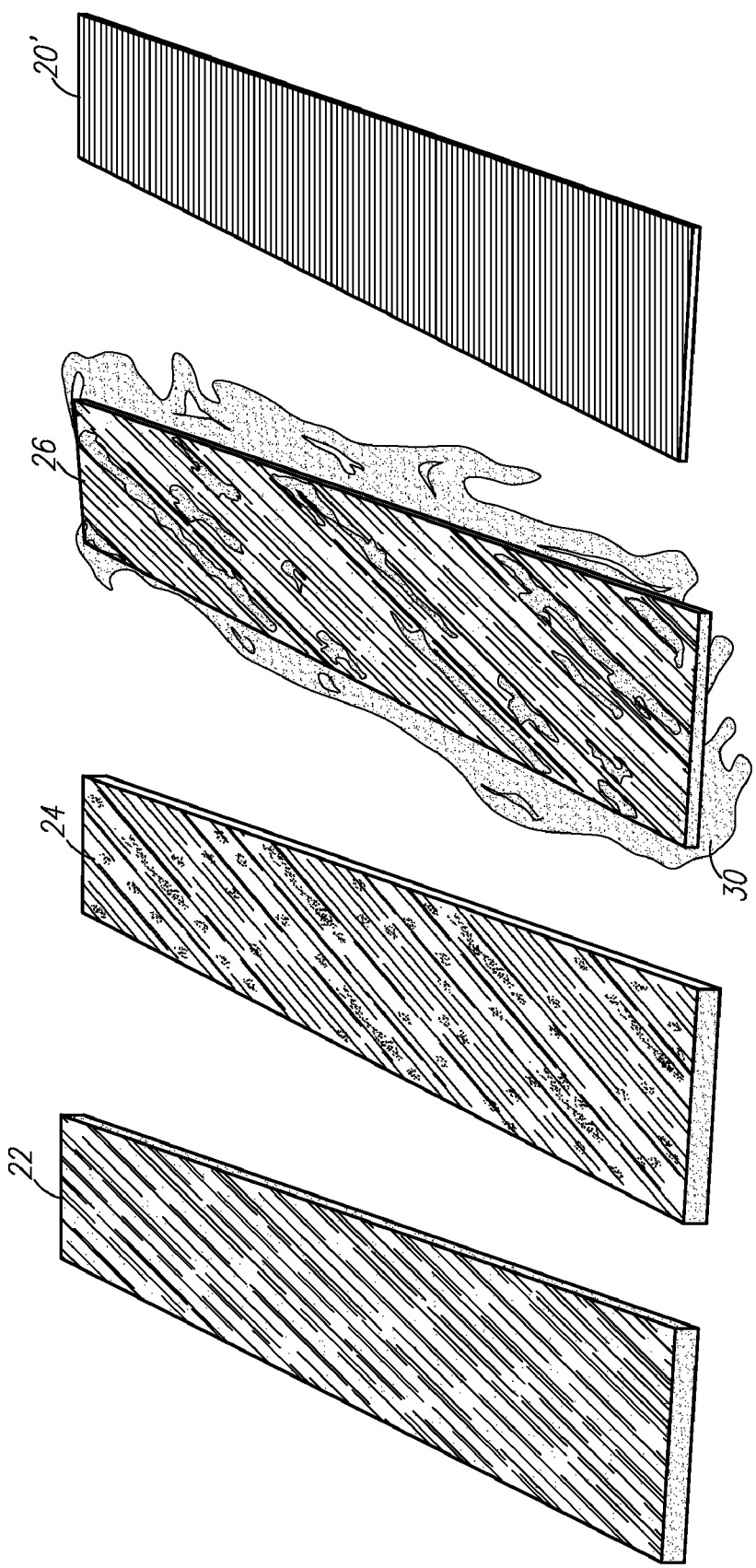

ROEBEL WINDING WITH CONDUCTIVE FELT

CROSS-REFERENCES TO RELATED APPLICATIONS

This application claims the benefit of provisional application Ser. No. 60/895,774 filed on Mar. 20, 2007 and incorporated herein by reference.

BACKGROUND OF THE INVENTION

This application relates generally to windings for making electrical coils, and more specifically to a Roebel winding with a conductive felt and non-conductive filler.

Windings for use in electrical coils, such as Roebel windings use fillers to fill interstices between the windings and a casing wall. Various techniques for filling voids between parts in electrically conductive devices are known. Unfortunately, many prior art techniques do not succeed in completely filling the voids and/or suppressing electrical discharge across the voids. Many void fillers act as a dielectric and allow a voltage to be impressed across the filler. Failure to fill the voids or at least suppress discharge will result in undesirable arcing between the components. Arcing leads to diminished efficiency and diminished life expectancy of the device.

An example of a conductive device where voids are present is a high voltage coil having windings that are intertwined in a braid-like fashion to form a Roebel bar. Roebel bars, or Roebelled windings, tend to have a highly discontinuous surface. Such a surface tends to have a great number of voids, or interstices, which must be properly filled in order to reduce mechanical and electrical stresses. U.S. Pat. No. 5,175,396 dated Dec. 29, 1992 to Emery, incorporated herein by reference, discloses such a Roebel bar. The U.S. Pat. No. 5,175,396 discloses a prior art void filler made from Dacron felt impregnated with epoxy. The U.S. Pat. No. 5,175,396 is directed to providing a void filler made from an insulating layer of mica paper and B stage epoxy. A semiconductive layer, preferably a paste of carbon filled epoxy, is placed between the inner insulating layer and a groundwall.

Other filler materials have been used to fill voids in electrical coils. Discussion of a resin rich felt material may be found in U.S. Pat. No. 5,633,477 dated May 27, 1997 to Smith, and incorporated by reference. Discussion of an inert filler material and a pyrolyzed glass fiber layer electrically coupled to the strands of a coil may be found in U.S. Pat. No. 5,066,881 dated Nov. 19, 1991 to Elton et al., also incorporated by reference. These fillers, and other prior art fillers and pre-pegs, are often difficult to install in high voltage coils and/or are not suitable for use in other applications, such as in the construction of an electrically shielded cabinet.

A conductive filler is disclosed in U.S. Pat. No. 6,559,384, issued on May 6, 2003 to Angell et al., and incorporated herein by reference. However, such a filler may make it difficult to properly form the coil into the desired shape, because sanding the profile of the Roebel filler to the coil shape after pre-consolidation without damaging the function of the electrical connection in the filler is difficult.

Additional prior art solutions are disclosed in U.S. Pat. No. 6,827,805 dated Dec. 7, 2004, to Angell et al. (which discloses a method of manufacture of a bar with the conductive resin filler of the '384 patent), and U.S. Pat. No. 6,677,848 B1 issued on Jan. 13, 2004, to Emery (which discloses a high-voltage winding and is described for use in a dynamoelectric machine), and U.S. Pat. No. 6,724,118 B2 issued on Apr. 20, 2004, to Emery, all incorporated herein by reference.

It can be difficult to produce a product that provides a conductive filler in the Roebel transposed area of the desired bar that can provide a conductive plane yet be sanded or machined to dimension without disrupting the fillers function. Other solid conductive fillers in the market use conductive resin and insulating mica flakes in a putty. This putty having conductive resin will short the strand to strand connections in the roebel bar as the conductive resin impregnates the insulation layer of the copper conductor roebel strands. The solution disclosed in U.S. Pat. No. 6,559,384, provided with an outer wrap jacket and insulating resin, is less functional when sanded or machined to dimension on the Roebel bar because the outer jacket is sanded through and disconnected thereby disrupting the continuity of the outer jacket function.

A non-conducting fiber with a non-conducting epoxy resin that has a conductive fleece over the circumference of the non-conducting felt could be used. The problem, however, comes with applying such a product to the stator bar during pre-consolidation. It molds and shapes to Roebeled stator bar however, it does not allow resin deep into the roebel transposition, leaving void areas. When such a Roebel bar is pressed and cured into shape, the corner edges typically need to be sanded to a radius so that they are not sharp. (electrical stress area). When sanding such a bar to create this radius, the conductive outer fleece is disconnected, interrupting the circuit function of the filler. The outer fleece must make electrical continuity around the circumference of the filler in order to function properly.

Another solution is a paste in a can that uses a conductive epoxy resin (carbon filled) with mica insulating flake in it. This paste is applied with a spatula and when cured on the preconsolidation bar, allows conductive resin to penetrate the Roebel transposition, thereby shorting the insulated copper single turns from one another. Each copper turn is insulated with a polyester/glass yarn for armor protection and separation so that they are isolated in the Roebel stranding. However, this polyester/glass yarn insulation can be impregnated with the conductive resin thereby shorting the strands to one another.

Desired is a solution that overcomes one or more of these prior-art deficiencies. In particular, it would be useful to have a non-conductive resin to penetrate the roebel transposition without having the above listed problems.

SUMMARY OF THE INVENTION

Provided is a Roebel bar and/or winding comprising: a plurality of conductors; a sheath surrounding the plurality of conductors; and a conductive filler filling one or more voids between the sheath and one or more of the conductors, wherein the conductive filler is comprised of a felt of conductive fibers impregnated with a non-conductive resin for filling voids within the felt of conductive fibers, and wherein the non-conductive resin binds at least a portion of the conductors together and/or to the conductive filler.

Also provided is a conductor comprising: a plurality of conductors insulated from each other and forming at least one stack; a dielectric sheath surrounding the plurality of conductors; and a conductive filler filling one or more voids between the sheath and one or more of the conductors.

The conductive filler is comprised of a felt of conductive carbon fibers impregnated with a non-conductive resin for filling voids within the felt of conductive fibers, and the non-conductive resin binds the conductive filler, and at least a portion of the conductors together.

Further provided is a composition for use in a Roebel bar and/or winding, the composition comprising a conductive felt impregnated with a partially cured non-conductive resin that is not yet solidified. The composition is used to form the Roebel bar by a method comprising the steps of:

providing a plurality of individually insulated conductors formed into one or more conductor stacks;

layering the composition on at least one edge of the one or more conductor stacks to cover the at least one edge to form a conductor assembly; and forming a pre-consolidation by pressing and curing the conductor assembly to cause a portion of the resin of the composition to flow into contact with one or more conductors of the one or more conductor stacks, thereby forming the composition into a conductive filler bound to the one or more conductors of the one or more conductor stacks.

Also provided is a method of manufacturing a Roebel bar and/or winding, the method comprising the steps of:

providing a conductive felt including carbon;

Impregnating the conductive felt with a non-conductive resin to form a resin saturated felt;

pressing the resin saturated felt to remove excess resin to form a resin impregnated felt;

heating the resin impregnated felt to thicken a viscosity of the resin to form a B-stage resin impregnated felt;

providing a plurality of individually insulated conductors formed into one or more conductor stacks;

layering the B-stage resin impregnated felt on at least one edge of the one or more conductor stacks to cover the at least one edge to form a conductor assembly; and forming a pre-consolidation by pressing and curing the conductor assembly to cause a portion of the resin of the B-stage resin impregnated felt to flow into contact with one or more conductors of the one or more conductor stacks, thereby forming the B-stage resin impregnated felt into a conductive filler bound to the one or more conductors of the one or more conductor stacks.

Additionally provided is a method of manufacturing a Roebel bar and/or winding, the method comprising the steps of:

carbonizing a fiber felt under heat for a specified time and temperature to result in a conductive felt of a specified resistance;

Impregnating the conductive felt with a non-conductive resin to form a resin saturated felt;

pressing the resin saturated felt to remove excess resin to form a resin impregnated felt;

heating the resin impregnated felt to partially cure the resin to thicken a viscosity of the resin to form a B-stage resin impregnated felt;

rolling the B-stage resin impregnated felt into a roll;

storing the B-stage resin impregnated felt for later use;

providing a plurality of individually insulated conductors formed into a plurality of conductor stacks;

unrolling and layering the rolled B-stage resin impregnated felt on opposite edges of the conductor stacks to fully cover the edges to form a conductor assembly;

forming a pre-consolidation by pressing and curing the conductor assembly to cause a portion of the resin of the B-stage resin impregnated felt to flow into contact with one or more conductors of the one or more conductor stacks, thereby forming the B-stage resin impregnated felt into a conductive filler bound to the one or more conductors of the one or more conductor stacks;

smoothing and/or shaping a surface of the conductive filler; and surrounding the pre-consolidation with a dielectric sheath, wherein the conductive filler fills voids between the plurality of conductors and the sheath.

Also provided are additional embodiments, some, but not all of which, are described hereinbelow.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIGS. 3-6 are schematics of various stages of the conductive filler such as would be utilized for the example Roebel bar of FIG. 1.

DETAILED DESCRIPTION OF THE EXAMPLE EMBODIMENTS

Provided is a conductive felt with a specified resistance. Also provided is a bar or coil of conductors, such as a Roebel bar, for use in electrical windings (such as in transformers, motors, or generators, for example), using the conductive felt as a conductive filler. This bar (or winding) typically would comprise a plurality of insulated conductor windings and the conductive filler that can be used to fill voids or interstices, created between the transposed conductor windings and a groundwall, or casing wall, of an electric coil.

Such a bar or coil is provided, for example, with a conductive filler including a conductive fiber core with a specified resistance (such as a felt) with a non-conductive resin that will give the user the ability to sand the profile of the filler to the coil shape after pre-consolidation (described in more detail below), without damaging the function of the electrical connection in the filler. It preferably uses a non-conducting resin for binding the conductors together, and therefore it will not short the conductor turns in the stator roebel bar when pressed into the Roebel bar. The product provides a conductive filler in the Roebel transposed area of the bar that can provide a conductive plane, and yet be sanded or machined to dimension without disrupting the filler's function.

A conductive fiber felt with a specified resistance comprising carbon fibers loaded with a non-conductive Epoxy Resin can be used to provide a surface resistance of preferrably between 50 and 5,000 ohms/sq. for use as a solid conductive filler in the Roebel transpositions on, for example, a high voltage stator coil.

Although a conductive felt (or perhaps a non-conductive felt) could be used with a conductive resin and insulating mica flakes in a putty form, such a conductive resin might short the strand to strand connections in the roebel bar, should the insulation of individual conductors be breached, as the conductive resin impregnates the insulation layer of the copper conductor roebel strands. Similarly, using a conductive felt with a specified resistance impregnated with non conductive resin, instead of using the device of U.S. Pat. No. 6,559,384 B1 with an outer wrap jacket and insulating resin, would be more functional when sanded and/or machined to dimension on the roebel bar because using the solution of the '384 patent leaves open the outer jacket being sanded through and disconnected, thereby disrupting the continuity of the outer jacket function. Thus, the improvements discussed herein can be used to avoid such problems.

Figure 1:
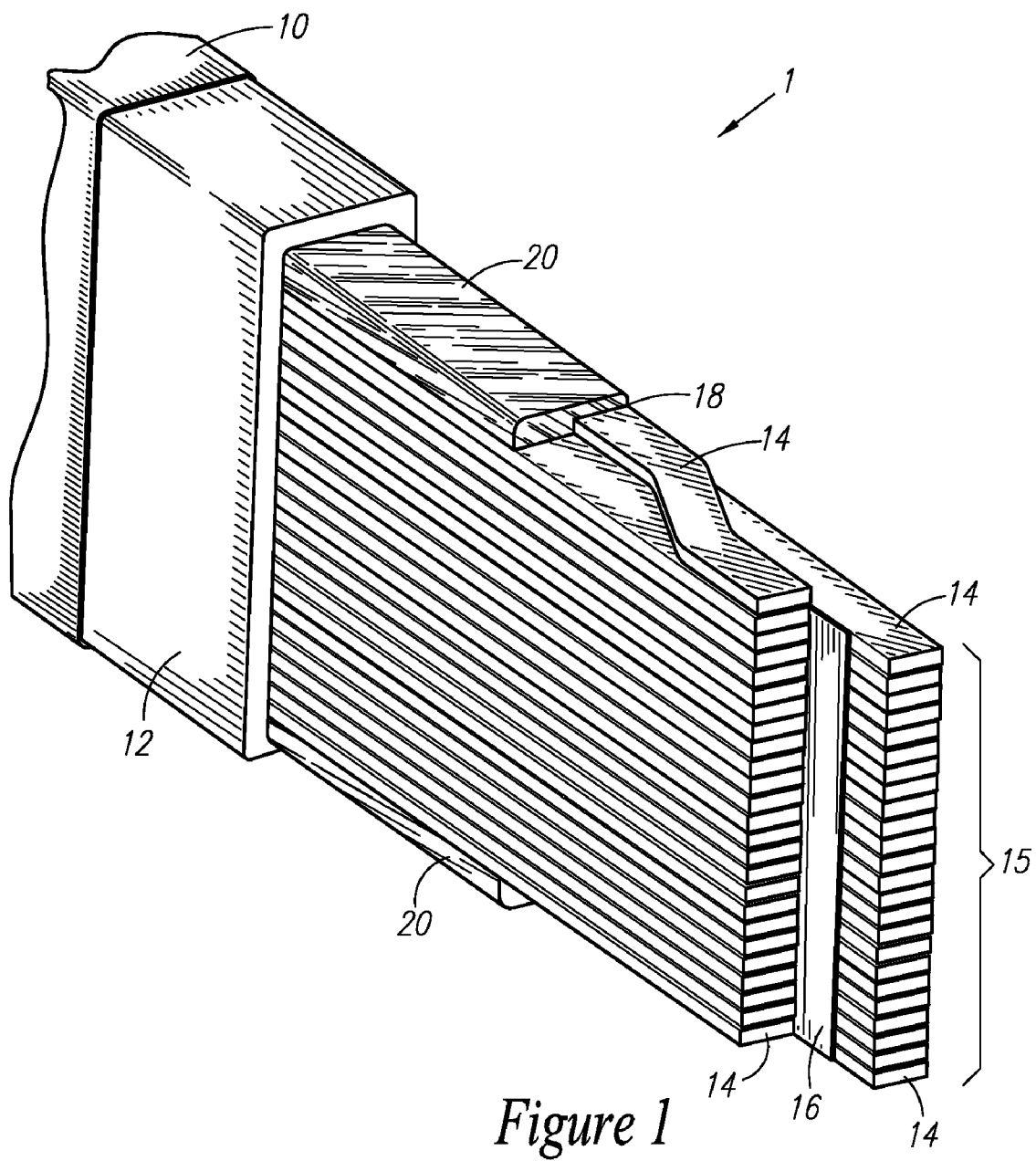
FIG. 1 shows a schematic of an example Roebel bar for one embodiment of the invention.

FIG. 1 shows an example embodiment of a Roebel bar 1 using the conductive filler 20. The Roebel bar 1 includes an outer covering (sheath) 10 that can be comprised of a conductive outer sheath (wrapped or coated around the bar) that is applied to provide corona protection, and an inner sheath 12 comprised of the main ground wall insulation, which is typically some sort of dielectric tape (comprising primarily of mica) which is normally applied after the coil or bar has been pre-consolidated into a solid mass. These sheaths enclose and protect the one or more stacks 15 of the plurality of conductors 14, which are typically comprised of a conducting metal, such as copper, each provided with an insulation coating. An stack separator 16 is provided to separate (and sometimes to help bind) the stacks 15 of conductors when more than one stack is provided. The individual insulated conductors 14 can, for example, be comprised of varnished or unvarnished wire (using a conductive metal such as copper) that is protected, for example, with Dacron (polyester) and glass fibers that have been fused to the conductor prior to forming the coil/bar. Other conductors (such as aluminum) and insulators (such a paper, rubber, or cloth), or combinations thereof, might also be utilized in alternative embodiments.

The conductive filler 20 with a specified resistance is provided between the inner sheath 12 and the conductors 14, as is particularly shown at location 18, where a portion of the conductive felt 20 has been compressed into shape to accommodate the local conductor 14. This conductive filler 20 is thus utilized to fill the voids between the conductors 14 and the inner sheath 12.

Figure 2:
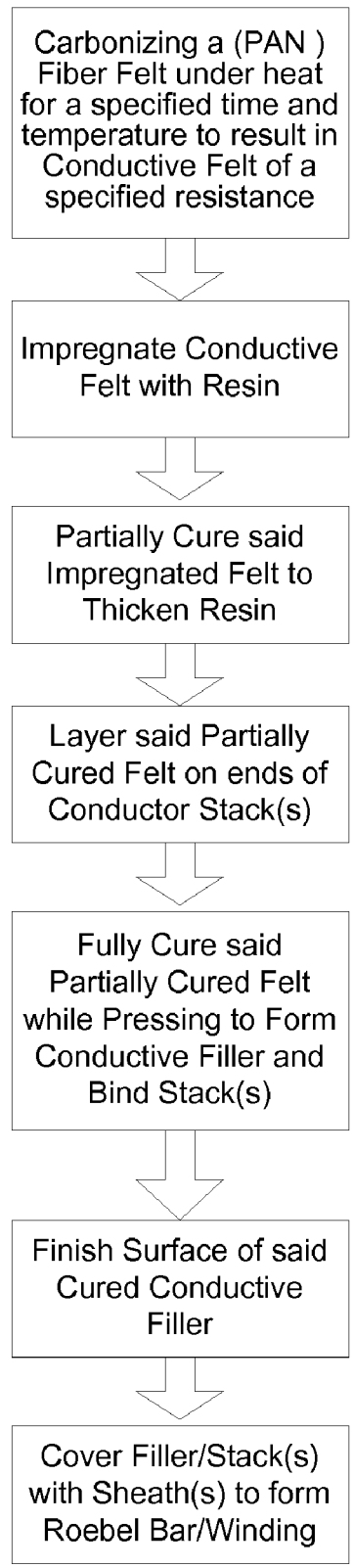
FIG. 2 is a flow chart of a manufacturing method for producing the Roebel bar of FIG. 1.

FIG. 2 is a flow chart showing a method of manufacturing the conductive filler with a specified resistance, and the Roebel bar of the embodiment of FIG. 1 using the conductive filler. FIGS. 3-6 show an example of the conductive filler (without the other components of the Roebel bar) in various stages of manufacture to illustrate the changes in the conductive felt to form the conductive filler, which can be manufactured in the following manner:

First, a conductive felt with a specified resistance comprised of a conductive material is provided. The embodiment of FIG. 1 uses a felt comprising carbon fibers that can be produced by carbonizing oxidized Polyacrylonitrile (PAN) felt to a specified resistance level between 50 and 5,000 ohms per square by heating the fiber felt to a further carbonized state, such as the conductive felt 22 as shown in FIG. 3. Alternatively, carbon fiber can also be produced from pitch (coal tar and petroleum products) to be utilized to make a woven or non-woven felt, as one alternative, among others.

A non-conductive resin is then added to this conductive felt to fill the voids within the felt. FIG. 4 shows a conductive felt 24 (such as the example felt 22 shown in FIG. 3) that is impregnated with a B-stage Epoxy resin, as discussed below.

To impregnate the conductive felt, a Bis A or Bis F novalac epoxy or combination thereof is impregnated into the felt at a lower viscosity to ensure penetration of the epoxy into the conductive felt. This can be done by placing the conductive felt into an epoxy bath comprising the non-conductive epoxy resin at the lower viscosity, leading to saturation of the felt. The felt is then squeezed between nip rollers to remove excess resin out of the conductive felt.

Then, the felt with impregnated epoxy (with excess removed) is partially cured by heating the epoxy impregnated felt in a drying oven even to "B-Stage" the epoxy resin to remove a substantial portion of the volatiles in the epoxy, and thus increasing the viscosity of the epoxy so that it will not run or flow from the impregnated felt (until pressure and heat are applied during preconsolidation step). B-stage refers to the epoxy in this partially cured state. The felt of this stage, as shown in FIG. 4, can be rolled into a roll for storage and transfer for use in further steps of manufacturing the Roebel bar, as described below.

To start the pre-consolidation process, the thus-impregnated felt 24 of FIG. 4 is then utilized to form the Roebel bar of FIG. 1. First, the felt with impregnated resin in B-state is unrolled, it may be cut into size (such as by using a slitting process to adjust its width to about the width of the conductor stacks), and it is placed on the top and bottom of the conductor stacks (formed any manner known in the art or to be developed), and this entire assembly (everything shown inside of sheath 10 in FIG. 1) is pressed and cured, such as by using heat and pressure on all four sides in a heated press, for example, resulting in an excess of epoxy flowing from the felt over and into the conductors 14, helping to bind the entire assembly together, resulting in the conductive filler 20 and conductor stacks 15 comprised of the conductors 14. An example of this epoxy flow from the cured conductive filler without showing the other components of the Roebel bar is shown by excess flow 30 of the filler 26 in FIG. 5. Note that it is preferred that the conductive filler be of sufficient width to cover the entire surface of the conductor stacks, as shown in FIG. 1.

Next, the resulting cured conductive filler is sanded to have a smooth surface, such as by using a rotating or reciprocal sanding tool, or hand sanded. This results in a smoother surface, such as that shown by the sanded conductive filler 20' of FIG. 6 (shown without the other components of the Roebel bar). Furthermore, this sanding step can also be used to remove the sharp corners, and any burrs or flashing, from the outer corners of the filler 20 to produce a radius edge of about 0.005" to 0.050" to provide the rounded edges shown in the outer corners of the conductive filler 20 of FIG. 1, thereby reducing greatly the voltage stress on the insulating sheath 12 of FIG. 1, The inner sheath 12 is then provided around the resulting assembly, such as by a wrapping of a material such as a dielectric tape (comprising primarily of mica, for example). A conductive outer sheath 10 is then applied to provide corona protection. This might be done by wrapping or coating the bar with the inner sheath 12 with the desired material. Note that alternative methods of manufacture might allow the inner sheath 12 to be wrapped around the conductor stacks with B-stage epoxy impregnated felt prior to the final curing step, possibly avoiding the sanding step in certain circumstances.

Accordingly, the B-stage epoxy impregnated felt can be manufactured in advance, and then used to manufacture a high voltage Roebel bar or coil having the conductive filler described herein with one or more of its associated benefits. This process provides a method of shaping and bonding the bundle of conductors 14 into a solid mass as shown in FIG. 1. The resin (i.e epoxy) in materials such as the b-staged epoxy felt and the b-staged stack separator (16) act as adhesive or bonding agents to bind the conductors 14 together. The B-staged epoxy resin of such a process will flow and fill the unevenness and voids in the Roebel transposition. The cured product of the example is noted for its ability to be sanded or machined on to a proper radius edge on the corners, yet not adversely affect its performance. The combined carbon felt with a specified resistance and non-conductive epoxy allows the dissipation of electrical energy (e.g., static charge), yet isolates the strands from shorting. Table 1, provided below, lists some of the major properties of a conductive felt of the embodiment described above.

TABLE 1

| CONDUCTIVE FILLER PROPERTIES | |
| --- | --- |
| Uncompressed Thickness (Inches) | 0.040"-0.500" |
| Compressed Thickness (Inches) | 0.020"-0.250" |
| Resin Type | Epoxy |
| Resin Content | 75% ± 15 |
| $T_g$ by DMA @ 180° C. | 162° C. |
| Thermal Class | 155° C. |
| Surface Resistance | 50-5,000 (Ω/sq.) |

Regarding $T_g$ (Glass Transition Temperature), Viscoelastic materials such as polymers typically exist in two distinct states. They exhibit the properties of a glass (high modulus) at low temperatures and those of a rubber (low modulus) at higher temperatures. By scanning the temperature during a DMA experiment, this change of state, the glass transition or alpha relaxation, can be observed.

Dynamic Mechanical Analysis (DMA) is a technique used to study and characterize materials. It is most useful for observing the viscoelastic nature of polymers. Forced oscillations involve the continued application of a force to the sample. An oscillating force is applied to a sample of material and the resulting displacement of the sample is measured. Most frequently this is done across a specified temperature range.

The invention has been described hereinabove using specific examples and embodiments; however, it will be understood by those skilled in the art that various alternatives may be used and equivalents may be substituted for elements and/or steps described herein, without deviating from the scope of the invention. Modifications may be necessary to adapt the invention to a particular situation or to particular needs without departing from the scope of the invention. It is intended that the invention not be limited to the particular implementations and embodiments described herein, but that the claims be given their broadest interpretation to cover all embodiments, literal or equivalent, disclosed or not, covered thereby.

What is claimed is:

1. A Roebel bar and/or winding comprising:
   a plurality of conductors;
   a sheath surrounding said plurality of conductors; and
   a conductive filler filling one or more voids between said sheath and one or more of said conductors, wherein
   said conductive filler is comprised of a felt of conductive fibers impregnated with a non-conductive resin for filling voids within said felt of conductive fibers, and wherein
   said non-conductive resin binds at least a portion of said conductors together and/or binds at least a portion of said conductors to said conductive filler.

2. The Roebel bar and/or winding of claim 1, wherein said resin of said conductive filler is in electrical contact with some portion of said plurality of said conductors for binding said some portion of said plurality of conductors together.

3. The Roebel bar and/or winding of claim 2, wherein said conductive filler does not electrically short said some portion of said plurality of conductors together.

4. The Roebel bar and/or winding of claim 1, wherein said conductive fibers are comprised of carbon, and wherein said non-conductive resin includes an epoxy resin.

5. The Roebel bar and/or winding of claim 1, wherein said conductive filler has a thickness that varies across a width of said conductive filler.

6. The Roebel bar and/or winding of claim 1, wherein said conductive filler has a density that varies.

7. The Roebel bar and/or winding of claim 1, wherein said conductive filler does not short any of said conductors together should said resin come into contact with more than one of said conductors.

8. The Roebel bar and/or winding of claim 1, wherein said felt of conductive fibers has a specified resistance.

9. A conductor comprising:
   a plurality of conductors insulated from each other and forming at least one stack;
   a dielectric sheath surrounding said plurality of conductors; and
   a conductive filler filling one or more voids between said sheath and one or more of said conductors, wherein
   said conductive filler is comprised of a felt of conductive carbon fibers impregnated with a non-conductive resin for filling voids within said felt of conductive fibers, and wherein
   said non-conductive resin binds said conductive filler, and at least a portion of said conductors together.

10. The conductor of claim 9, wherein said conductive filler does not short any of said conductors together should said resin come into contact with more than one of said conductors.

11. The conductor of claim 9, wherein said conductive filler has a thickness that varies across a width of said conductive filler.

12. The conductor of claim 9, wherein said conductive filler has a density that varies.

13. A composition for use in a Roebel bar and/or winding, said composition comprising a conductive felt of a specified resistance impregnated with a partially cured non-conductive resin that is not yet solidified, wherein said composition is used to form the Roebel bar by a method comprising the steps of:
   providing a plurality of individually insulated conductors formed into one or more conductor stacks;
   layering said composition on at least one edge of said one or more conductor stacks to cover said at least one edge to form a conductor assembly;
   forming a pre-consolidation by pressing and curing said conductor assembly to cause a portion of the resin of said composition to flow into contact with one or more conductors of said one or more conductor stacks, thereby forming said composition into a conductive filler bound to said one or more conductors of said one or more conductor stacks.

14. The composition of claim 13, further comprising the step of smoothing and/or shaping a surface of said conductive filler.

15. The composition of claim 14, wherein said method further comprises the step of surrounding said pre-consolidation with a dielectric sheath, wherein said conductive filler fills voids between said plurality of conductors and said sheath.

16. The composition of claim 13, wherein said composition is put onto at least two different edges of said one or more conductor stacks, and wherein said method further comprises the step of surrounding said pre-consolidation with a dielectric sheath, wherein said conductive filler fills voids between said plurality of conductors and said sheath.

17. A Roebel bar and/or winding comprising:
   a plurality of conductors;
   a sheath surrounding said plurality of conductors; and a conductive filler filling one or more voids between said sheath and one or more of said conductors, wherein said conductive filler is comprised of a felt of conductive fibers including carbon that are impregnated with an epoxy resin for filling voids within said felt of conductive fibers, and wherein said resin is fully cured after placement to bind at least a portion of said conductors together and/or bind a portion of said conductors to said conductive filler.

18. The Roebel bar and/or winding of claim 17, wherein said resin of said conductive filler is in electrical contact with some portion of said plurality of said conductors.

19. The Roebel bar and/or winding of claim 18, wherein said conductive filler does not electrically short said some portion of said plurality of conductors together.

20. The Roebel bar and/or winding of claim 17, wherein said conductive filler has a thickness that varies across a width of said conductive filler.

21. The Roebel bar and/or winding of claim 17, wherein said resin is a non-conductive resin.

22. A Roebel bar and/or winding comprising:

a plurality of conductors;

a sheath surrounding said plurality of conductors; and a conductive filler filling one or more voids between said sheath and one or more of said conductors, wherein said conductive filler is comprised of a felt of conductive fibers that are impregnated with a resin for filling voids within said felt of conductive fibers, and wherein said resin is fully cured after placement to bind at least a portion of said conductors together and/or to bind a portion of said conductors to said conductive filler, wherein said resin of said conductive filler is in electrical contact with some of said plurality of said conductors without electrically shorting said said plurality of conductors together.

23. The Roebel bar and/or winding of claim 22, wherein said conductive filler has a thickness that varies across a width of said conductive filler.

* * * * *